United States Patent

[11] 3,609,447

[72] Inventors Ryoichi Hirota Yokohama; Tooru Fujishima, Yokohama; Gentaro Miyazaki, Fujisawa-shi; Tadahiko Iwasaki, Kamakura-shi; Mitsuharu Akatsu, Yokohama; Tomoo Kinoshita, Yokohama, all of Japan

[21] Appl. No. 809,244

[22] Filed Mar. 21, 1969

[45] Patented Sept. 28, 1971

[73] Assignee Hitachi, Ltd. Tokyo, Japan

[32] Priority Mar. 27, 1968

[33] Japan

[31] 43/19393

[54] HIGH VOLTAGE REGULATION CIRCUIT FOR A COLOR TELEVISION RECEIVER
8 Claims, 12 Drawing Figs.

[52] U.S. Cl. .......... 315/27

[51] Int. Cl. .......... H01j 29/76

[50] Field of Search .......... 315/27 TD, 27 XY, 27 SR, 22

[56] References Cited

UNITED STATES PATENTS

| | | | |
|---|---|---|---|
| 3,428,856 | 2/1969 | Jones | 315/22 X |
| 3,153,174 | 10/1964 | Claypool | 315/27 |
| 2,906,919 | 9/1959 | Thor | 315/24 |

*Primary Examiner*—Rodney D. Bennett, Jr.
*Assistant Examiner*—Joseph G. Baxter
*Attorney*—Craig, Antonelli, Stewart & Hill

ABSTRACT: A high-voltage regulation circuit for a color television receiver comprising a horizontal deflection yoke, a high-voltage circuit and a variable inductance element connected in parallel with said horizontal deflection yoke, thereby controlling the inductance of said variable inductance element in response to the variation of a high voltage of the high-voltage circuit.

INVENTORS
RYOICHI HIROTA, TOORU FUJISHIMA
GENTARO MIYAZAKI, TADAHIKO IWASAKI,
MITSUHARU AKATSU AND TOMOO KINOSHITA

BY Craig, Antonelli, Stewart & Hill
ATTORNEYS

INVENTORS
RYOICHI HIROTA, TOORU FUJISHIMA,
GENTARO MIYAZAKI, TADAHIKO IWASAKI,
MITSUHARU AKATSU AND TOMOO KINOSHITA

BY Craig, Antonelli, Stewart & Hill

ATTORNEYS

INVENTORS
RYOICHI HIROTA, TOORU FUJISHIMA,
GENTARO MIYAZAKI, TADAHIKO IWASAKI,
MITSUHARU AKATSU AND TOMOO KINOSHITA

BY Craig, Antonelli, Stewart & Hill
ATTORNEYS

INVENTORS
KYOICHI HIROTA, TOORU FUJISHIMA
GENTARO MIYAZAKI, TADAHIKO IWASAKI,
MITSUHARU AKATSU AND TOMOO KINOSHITA

BY Craig, Antonelli, Stewart & Hill

ATTORNEYS

INVENTORS
RYOICHI HIROTA, TOORU FUJISHIMA,
GENTARO MIYAZAKI, TADAHIKO IWASAKI,
MITSUHARU AKATSU AND TOMOO KINOSHITA

BY Craig, Antonelli, Stewart & Hill
ATTORNEYS

HIGH VOLTAGE REGULATION CIRCUIT FOR A COLOR TELEVISION RECEIVER

BACKGROUND OF THE INVENTION

1. FIELD OF THE INVENTION

The present invention relates to a high voltage regulation circuit, and more particularly to a circuit for regulating the anode voltage of a cathode-ray tube in a color television receiver.

2. DESCRIPTION OF THE PRIOR ART

In a black-and-white television receiver, since the variation of the beam current of a cathode-ray tube (CRT) due to the brightness of the picture is small, the variation of the high voltage due to the variation of the beam current does not cause many problems. Therefore, no high-voltage regulation circuit is usually used in such a system. In a color television receiver, however, the variation of the beam current is about five times compared with that of the black-and-white television receiver, so that the variation of the high voltage is remarkably large. As a result, various problems occur as follows:

1. when the beam current is decreased, the high voltage is increased, so that arcing between electrodes is apt to occur;
2. when the beam current is increased, the high voltage is decreased, so that the brightness of a picture is reduced;
3. the variation of the beam current causes the horizontal and vertical raster size to be varied;
4. the deviation of the convergence varies remarkably; and
5. the deviation of focusing is large.

Therefore, in order to prevent the occurrence of such problems it is required to regulate the high voltage.

The known high-voltage regulation circuit is such that a shunt regulator tube is connected in parallel with the high-voltage output, whereby the anode voltage is regulated to maintain substantially a predetermined value with variation of the beam current of the CRT. However, the shunt regulator tube is a triode of a special type which wears quickly with a high anode voltage and a large anode loss, and therefore, it is very expensive, has a short life and is not economical. Further, in a color television receiver in which an anode voltage exceeding 20 kilovolts is used a shunt regulator tube provided therewith radiates x-ray, so that it injuriously affects the human body. Furthermore, such known high-voltage regulation circuit makes it difficult to realize an all transistorized color television receiver.

SUMMARY OF THE INVENTION

An object of the present invention is to provide a novel high-voltage regulation circuit without using a shunt regulator tube.

Another object of the present invention is to provide a high-voltage regulation circuit which makes it possible to realize an all transistorized color television receiver.

In order to achieve the above-mentioned objects the circuit according to the present invention is comprised of a high-voltage regulation coil (generally referred to as a variable inductance element) connected in parallel with the horizontal deflection coil, which is variable in inductance, and a means for detecting a variable component of the high voltage and for controlling the inductance of the high-voltage regulation coil in response to the thus detected signal.

Other objects, features and advantages of the present invention will be apparent from the following detailed description taken in conjunction with the accompanying drawings.

DESCRIPTION OF THE PREFERRED EMBODIMENTS

Figure 1:
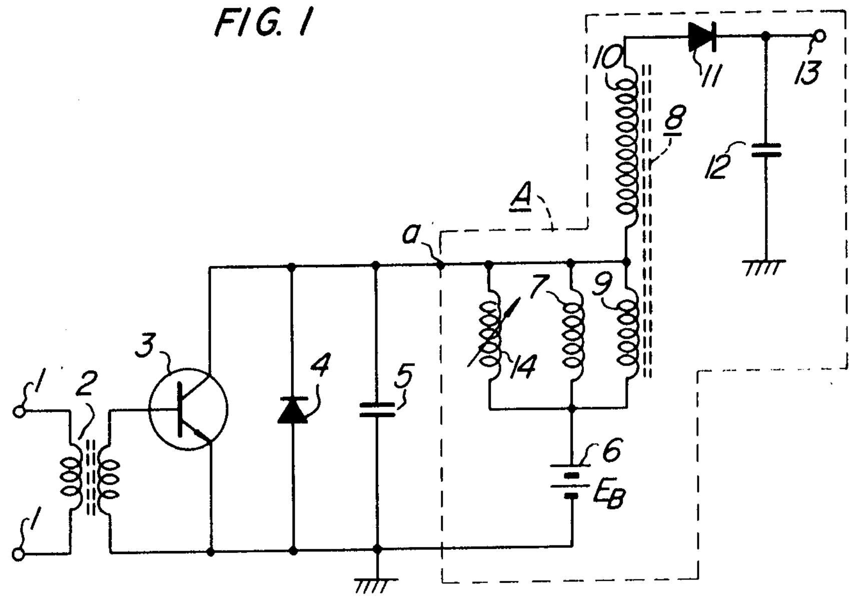
FIG. 1 is a circuit diagram explaining the basic principle of the present invention.

Referring to FIG. 1 the basic principle of the present invention will be described, in which numeral 1 designates pulse input terminals, 2 a transformer, 3 a horizontal output transistor, 4 a damper diode, 5 a resonance capacitor, 6 a voltage source, 7 a horizontal deflection yoke, 8 a flyback transformer (FBT), 9 a primary winding of the flyback transformer, 10 a secondary winding of the flyback transformer, 11 a high-voltage rectifying diode, 12 a capacitor and 13 high-voltage output terminals. The constitution of the above circuit is entirely the same as the horizontal output circuit and high-voltage circuit of the conventional color television receiver. Numeral 14 designates a high-voltage regulation coil, which is connected in parallel with the horizontal deflection coil, the invention being characterized thereby.

Figure 2:
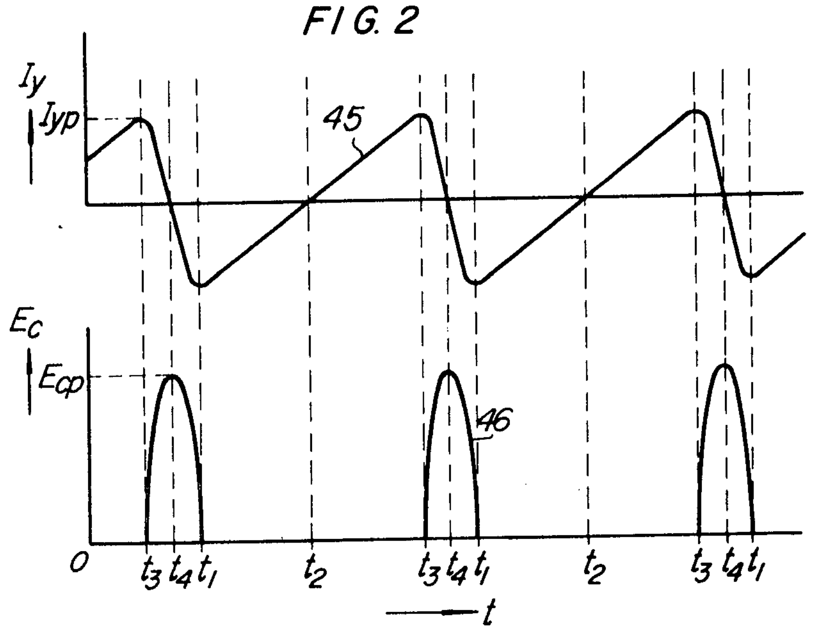
FIG. 2 is a diagram showing waveforms of voltage and current for explaining the operation of the horizontal deflection circuit and the high-voltage circuit in a color television receiver.

FIG. 2 shows functional waveforms of the horizontal deflection output, in which numeral 45 is the waveform of the current flowing into the horizontal deflection yoke 7, 46 the waveform of the collector voltage of the horizontal output transistor 3, $t_1 \rightarrow t_2 \rightarrow t_3$ the scanning term and $t_3 \rightarrow t_4 \rightarrow t_1$ the flyback term. The operation of the present invention will be described hereinafter.

Though the following description of the operation is made in regard to a transistorized television receiver, it is needless to say that the description can be employed also in a vacuum tube type television receiver. It is now assumed that since the inductance $L_p$ of the primary winding 9 of the flyback transformer 8 is generally sufficiently large as compared with the inductance $L_y$ of the horizontal deflection yoke 7, the inductance $L_p$ is negligible.

Now, the parallel inductance $L$ of the horizontal deflection yoke 7 and the high-voltage regulation coil 14 is expressed as:

$$L = \frac{L_X \cdot L_Y}{L_X + L_Y} \qquad (1)$$

where $L_x$ represents the inductance of the high-voltage regulation coil. Assuming that $I_y$ represents a current flowing in the horizontal deflection yoke 7 and $I_x$ represents that flowing in the high-voltage regulation coil 14, the sum of the currents $I_{xy}$ is expressed as: $I_{xy}=I_x+I_y$. (2) If when $t=t_2$ an input pulse is applied to the input terminal 1, the horizontal output transistor 3 is made conductive, the voltage $E_B$ of the power source 6 is applied across the horizontal yoke 7, and the yoke current $I_y$ is linearly increased at the constant rate of $E_B/L_y$ as;

when $t_2$ $t$ $t_3$ $$I_y = E_B/L_y(t-t_2) \qquad (3)$$

$$I_{xy} = E_B/L\ (t-t_2) \qquad (4)$$

Next, when $t=t_3$, $I_Y$ is the maximum value $I_{yp}$ and $I_{xy}$ is the sum $I_{xyp}$ of the maximum current flowing through the horizontal deflection yoke 7 and that flowing through the high-voltage regulation coil 14, the horizontal output transistor 3 is cutoff and the flyback term starts. Now, consider the case without the high-voltage regulation coil 14. The yoke current $I_Y$ flows into the resonance capacitor 5, so that parallel resonance is caused by the inductance $L_Y$ of the horizontal deflection yoke 7 and the capacitance C of the resonance capacitor 5 and thus, a high pulse voltage as shown by waveform 46 in FIG. 2 is developed at the collector of the horizontal output transistor 3. That is, when $t_3 \leqq t \leqq t_1$, is expressed approximately by:

$$I_Y \doteqdot I_{YP} \cdot \cos \frac{t-t_3}{\sqrt{L_Y C}} \qquad (5)$$

the collector voltage $E_C$ is given by:
ps $$E_C \doteqdot -L_y \frac{dI_y}{dt} \doteqdot I_{yp} \sqrt{\frac{L_y}{C}} \sin \frac{t-t_3}{\sqrt{L_y C}} \quad (6)$$

and therefore, at approximately a quarter of the resonance period, namely, when $t=t_4$, $E_C$ makes its maximum voltages $E_{cp}$.

$$E_{cp} = I_{yp} \sqrt{\frac{L_y}{C}} \quad (7)$$

On the other hand, the yoke current $I_y$ which reaches the positive maximum value at $t=t_3$ becomes zero at $t=t_4$ and thereafter the direction of $I_y$ is reversed. At $t=t_1$ the yoke current $I_y$ reaches the negative maximum value $-I_{yp}$ and simultaneously the collector voltage $E_C$ becomes zero. Thereafter, $E_C$ develops a negative voltage and then the damper diode 5 conducts so that the scanning term starts. At this time, the source voltage $E_B$ is again applied across the deflection yoke 7, the yoke current $I_y$ is linearly increased from $-I_{yp}$ at the constant rate of $E_B/L_Y$, and thus, it becomes zero at $t=t_2$. Then, if an input pulse is again applied to the input terminal q, the transistor 3 is rendered conductive to return to its initial state. Thus, by repeating such a cycle horizontal scanning is carried out.

Further, the anode voltage of the cathode ray tube is provided in such the manner that a high pulse voltage $E_c$ developed at the collector terminal of the horizontal output transistor 3 during the operation of the aforementioned flyback transformer which is boosted by the flyback transformer 8 and the voltage appearing across a secondary winding 10 of the transformer 8 is rectified by the high-voltage rectifier diode 11. Therefore, the basic principles of the present invention for regulating the variation of the above-mentioned anode voltage are to control the voltage developed across the primary winding 9 of the flyback transformer 8, i.e. the collector voltage $E_C$ of the horizontal output transistor 3 in response to the amount of variation in anode voltage so as to reduce the variation thereof.

On the other hand, consider the case where the high-voltage regulation circuit 14 is added to the horizontal deflection circuit. During the scanning term, $t_2 \leqq t \leqq t_3$, no variation in yoke current $I_y$ occurs even up the addition of the coil 14, as indicated by the formula (3), since the coil 14 and the yoke 7 are connected in parallel to each other with respect to the power source 6. Therefore, the raster size is not varied.

On the other hand, when $t_3 \leqq t \leqq t_1$, namely, during the flyback term, a resonance circuit is constituted by the coil 7, the coil 14 and the capacitor 5, whose resonance current $I_{xy}$ (i.e. the sum of current flowing in the yoke 7 and the coil 14) is given approximately by:

$$I_{xy} \doteqdot I_{xyp} \cos \frac{t-t_3}{\sqrt{LC}} \quad (8)$$

Also, the collector voltage $E_C$ of the transistor 3 is given approximately by:

$$E_C \doteqdot -L \frac{dI_{xy}}{dt} \doteqdot I_{xyp} \sqrt{\frac{L}{C}} \sin \frac{t-t_3}{\sqrt{LC}} \quad (9)$$

Therefore, $E_C$ makes the maximum voltage $E_{cp}$ at $t=t_4$.

$$E_{cp} = I_{xyp} \sqrt{\frac{L}{C}} \quad (10)$$

On the other hand, the maximum current $I_{xyp}$ of $I_{xy}$ is obtained from the formula (4) as:

$$I_{xyp} = \frac{E_B}{L} (t_3 - t_2) \quad (11)$$

From the formulas (10) and (11) the aforementioned maximum voltage $E_{cp}$ can also be given by:

$$E_{cp} = \frac{E_B}{\sqrt{LC}} (t_3 - t_2) \quad (12)$$

From the formula (12), it will be understood that the peak value $E_{cp}$ of a pulse appearing at the collector of the transistor 3 varies inversely with the root of the parallel inductance L. Thus, for example, in case the beam current of the CRT is increased so that the anode voltage is lowered, in order to regulate the lowered anode voltage, the drop component thereof must be compensated. For this purpose the voltage $E_{cp}$ can be made to rise. In other words, the parallel inductance L will be reduced. Also, from formula (1) it is seen that the inductance $L_x$ of the high-voltage regulation coil will be reduced. In order to vary the inductance $L_x$ the number of turns of the coil 14 is varied or magnetic saturation in a core which is inserted into the coil 14 is used. The method for varying the number of turns of the coil 14 is such that a plurality of taps are provided on the coil 14 and these are suitably changed over depending upon the variation of a beam current of the CRT. However, the utilization of magnetic saturation of the core is the most simple and effective method.

Description will be made of some embodiments according to the present invention in detail hereunder. The following embodiments are shown merely by an essential portion A taken by separating the associated circuit at a point *a* in FIG. 1.

Figures 3, 4A:
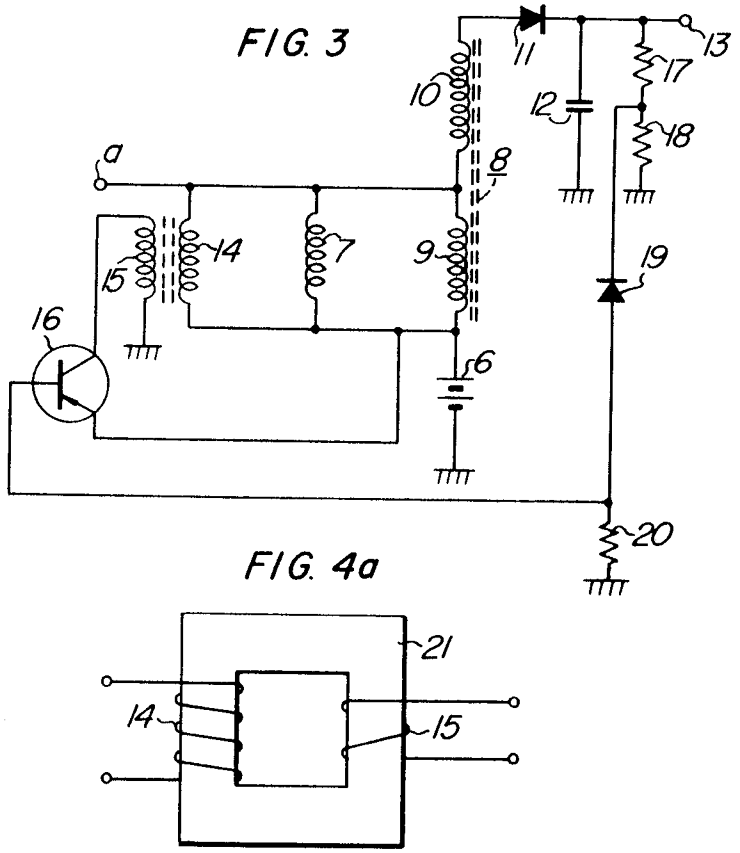
FIG. 3 is a diagram showing an essential portion of the circuit according to an embodiment of the present invention.
FIGS. 4*a* and 4*b* are diagrams showing embodiments of high-voltage regulation coil.

Referring to FIG. 3, there is shown one embodiment of the present invention, in which reference numerals of parts correspond to those in FIG. 1, the numeral 15 designates a control winding for controlling the inductance $L_x$ of the high-voltage regulation coil 14, 16 a high-voltage regulation transistor, 17 and 18 high-voltage dividing resistors, 19 a Zener diode and 20 a resistor.

Operation of the aforementioned embodiment will be described. A variation of the anode voltage is detected across the high-voltage dividing resistor 18, and the thus detected signal corresponding to the variation is applied through the Zener diode 19 to the base electrode of the high-voltage regulation transistor 16. The emitter electrode of the transistor 16 is connected to the power source 6 and the collector electrode is connected to one end of the control winding 15, the other being grounded. One embodiment of a high-voltage regulation variable reactance $L_x$ is shown in FIG. 4*a*, in which numeral 21 represents a saturable core, 14 and 15 the high-voltage regulation coil and the control winding, respectively. The magnetic flux density of the saturable core 21 is controlled by the magnitude of the current flowing in the control winding 15. That is, when the current flowing in the winding 15 increases so that the magnetic flux density of the saturable core 21 approaches the saturation magnetic flux density thereof, the magnetic permeability $\mu$ is decreased, so that the inductance $L_x$ of the winding 14 is also reduced. Further, if the current is decreased the reverse phenomenon takes place, namely, the magnetic permeability $\mu$ is increased and the reactance $L_x$ is also increased.

The high-voltage regulation variable inductance $L_x$ which is constituted as described above operates in such a manner that if the anode voltage is decreased, the base voltage of the transistor 16 is lowered and the collector current passing through the control winding 15 is increased whereby the magnetic flux density of the saturable core 21 approaches the saturation magnetic flux density thereof, so that the inductance $L_x$ is decreased and the collector voltage of the horizontal output transistor 3 is increased. Thus, high-voltage regulation can be achieved.

Figure 4B:
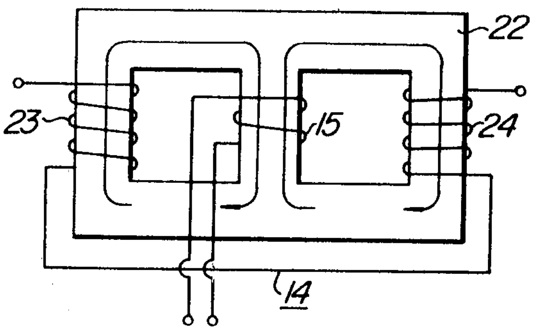

FIG. 4*b* shows another embodiment of the high-voltage regulation variable inductance $L_x$ whose operation is the same as that in FIG. 4*a* , the description thereof being omitted accordingly. The construction is such that windings 23 and 24 into which the high-voltage regulation coil 14 are separated are wound around a tripod-type saturable core 22 and the control winding 15 is also wound therearound.

The thus constructed inductance is advantageous in that since no voltage is induced in the control winding 15 by the voltage appearing across the high-voltage regulation coil 14 depending upon the variation of the beam current of the CRT, the protection of the high-voltage regulation transistor 16 can be provided. On the contrary, the same effect is obtained also which such a construction of the variable inductance that the windings 23 and 24 are used as control windings and the winding 15 is used as a high-voltage regulation coil. In FIG. 3, a signal detected across the dividing resistor 18 may be applied directly to the base electrode of the transistor 16'. However, if the Zener diode 19 is inserted between the resistor 18 and the base electrode of the transistor 16, the base DC potential can advantageously be selected arbitrarily.

Figure 5:
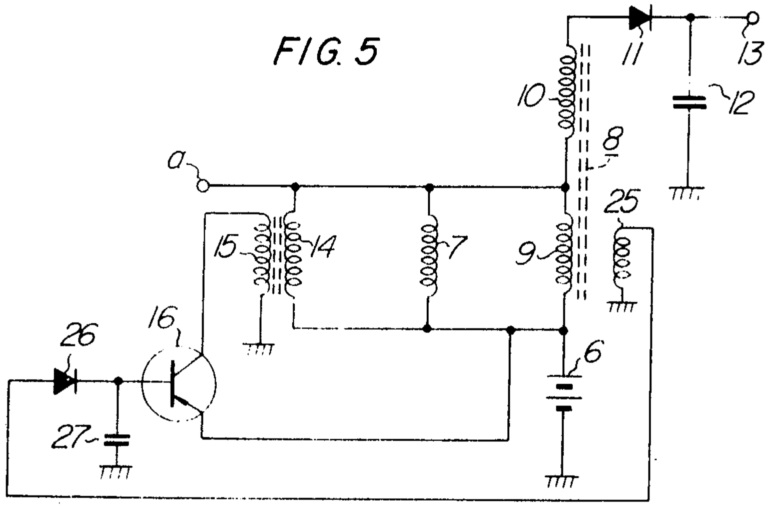
FIGS. 5 and 6 are diagrams showing an essential portion of the circuit according to another embodiment of the present invention.

Referring to FIGS. 5 there is shown a circuit diagram of a further embodiment of the present invention, in which reference numerals of parts used therein corresponds to those in FIG. 3, numeral 25 represents a winding wound around the flyback transformer 8 for detecting a variation in high voltage, 26 a diode and 27 a capacitor.

The regulating operation in the aforementioned circuit is entirely the same as that of the embodiment shown in FIG. 3. It is, however, different in the means for detecting the variation in anode voltage. That is, in this embodiment, a positive pulse induced in the detecting winding 25 wound around the flyback transformer 8 is rectified smoothly through the diode 26 and the capacitor 27 and thereafter it is applied to the base electrode of the high-voltage regulation transistor 16.

Figure 6:
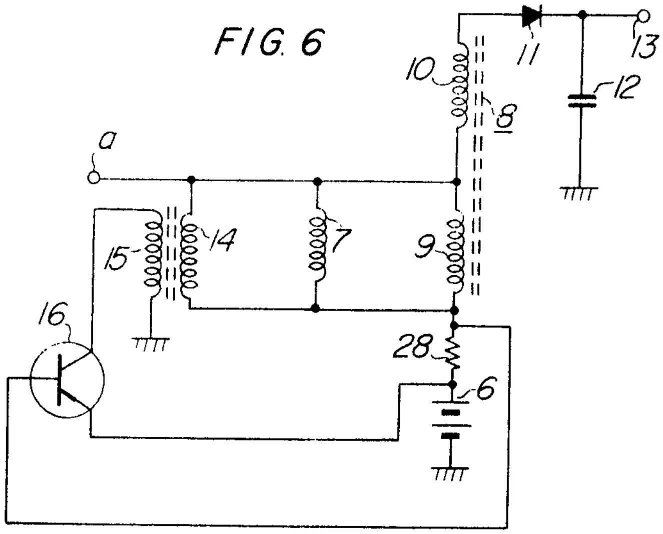

Referring to FIG. 6 there is shown a circuit diagram of a further embodiment of the present invention, in which reference numerals of parts used therein correspond to those in FIG. 3 and numeral 28 represents a resistor. In this embodiment, a current passing through the DC voltage source is used as a means for detecting the variation in anode voltage. For example, as the beam current of the CRT is increased, the current of the DC voltage source for supplying the power increases. Therefore, if the resistor 28 is connected in series to the source 6, a voltage which is variable according to the high voltage can be derived across the resistor 28, Thus, the derived voltage across the resistor is applied to the base electrode of the high-voltage regulation transistor 16.

Figures 7, 8, 9:
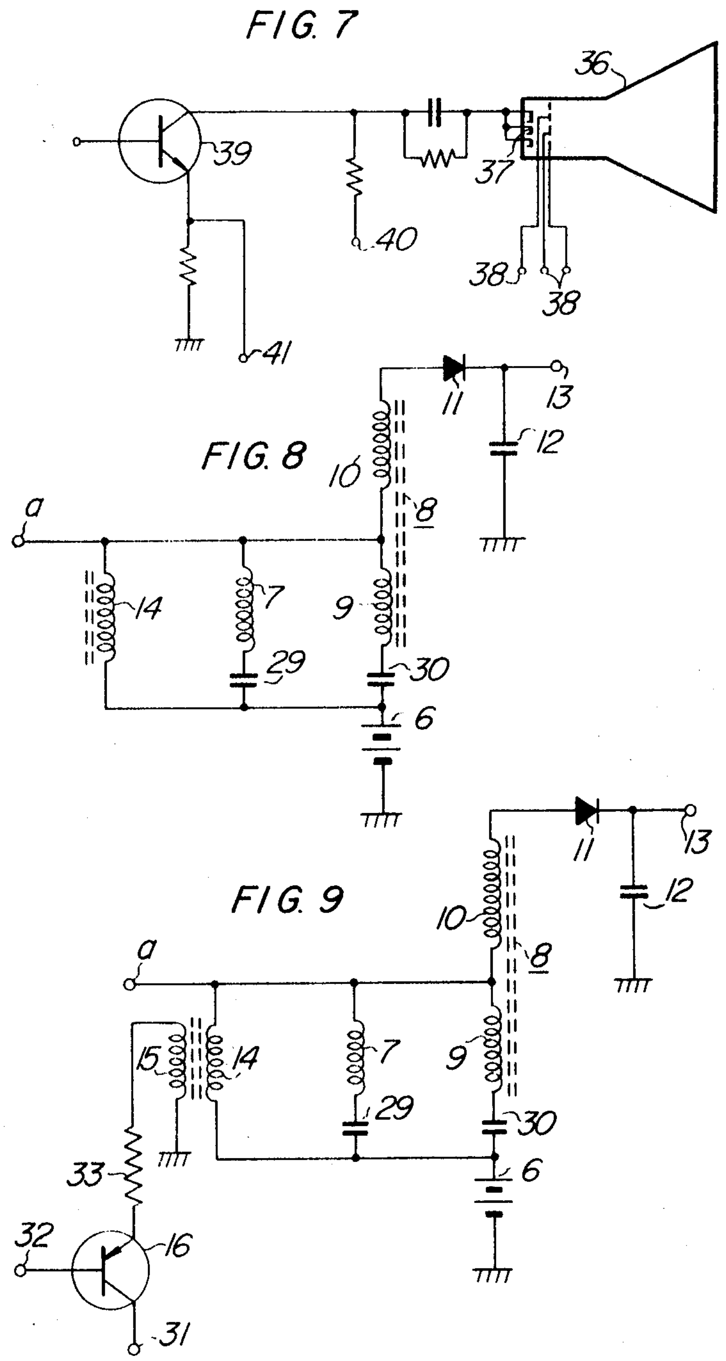
FIG. 7 is a diagram showing an embodied circuit for deriving a control signal.
FIGS. 8 to 11 are diagrams showing essential portions of the circuit according to further embodiments of the present invention.

In the aforementioned respective embodiments, the variation in high voltage is derived from the high-voltage circuit or the horizontal deflection circuit. It is, however, not limited to such as arrangement. For example, the variation in high voltage can be obtained in such a manner that voltage proportional to the amplitude signal is derived from the transistor developing an output of the luminance signal or the chrominance signal. Various methods for applying the luminance signal and the chrominance signal to a cathode-ray tube are proposed. Referring to FIG. 7, there is shown a circuit for deriving the variation in anode voltage from a transistor in the last stage developing a luminance signal in a color difference system in which the luminance signal and the difference signal between the luminance signal and a chrominance signal are applied to the cathode and the grids of a cathode-ray tube, respectively. In the figure, numeral 36 represents a cathode-ray tube 37, the cathode thereof, 38 terminals for applying the difference signals between a luminance signal and the respective chrominance signals to the grids of the CRT, 39 a video output terminal for a control signal. An output signal from the control signal output terminal 41 is applied to the base electrode of the high-voltage regulation transistor 16 shown in the above-mentioned embodiments. Similarly in the respective chrominance signals, each control signal can be introduced from each transistor in its last stage. The luminance signal $E_y$ is given by $E_y=0.30E_R+0.59E_G+0.11\ E_B$ (13), where $E_R$, $E_G$ and $E_B$ the voltage components of red, green and blue signals, respectively. In particular, since the variation of the green signal $E_G$ is nearer to that of the luminance signal $E_Y$ than those of the remainder, the variation of the green signal $E_G$ is used as another control signal applied to the regulation transistor 16.

Referring to FIG. 8, there is shown a circuit of a still further embodiment of the present invention, in which reference numerals of parts correspond to those in FIG. 1, and numerals of parts correspond to those in FIG. 1, and numerals 29 and 30 represent DC blocking capacitors. In this embodiment no high-voltage regulation transistor and control winding are required contrary to the above-mentioned embodiments and thus, the high-voltage regulation circuit is quite simple and economical. The circuit of the present embodiment is so constituted that the DC blocking capacitors 30 and 29 are connected in series with the primary winding 9 of the flyback transformer 8 and the horizontal deflection yoke 7, respectively, so that all of the DC current supplied from the DC power source 6 to the transformer 8 flows the high-voltage regulation coil 14. As high-voltage regulation coil 14, for example, a coil wound around a saturable core is used. If the beam current of the CRT is increased, the DC current flowing in the high-voltage regulation coil 14 is also increased. As a result, the magnetic flux density of the saturable core approaches the saturation flux density thereof, so that the inductance $L_x$ of the coil 14 is reduced to cause the circuit to boost the reduced high voltage, thus the circuit is operated to regulate the high voltage. The circuit in this case is advantageous in that since the DC current flowing in the flyback transformer 8 is blocked by means of the DC blocking capacitor 30, the flyback transformer 8 is not easily saturated thereby making it possible to provide a transformer of small size.

Referring to FIG. 9 a circuit diagram of still another embodiment of the present invention is illustrated, in which reference numerals of parts used therein correspond to those in FIGS. 3 and 8, numeral 31 designates a DC power source terminal, 32 an input terminal for a control signal and 33 a resistor inserted between the emitter electrode of the transistor 16 and the control winding 15. In the present embodiment means for controlling the high-voltage regulation coil 14 comprise in combination a control winding 15 wound around a saturable core and the DC blocking capacitors 29 and 30 which are provided to thereby make all of the DC current flow in the coil 14 wound around the saturable core. The control input terminal 32 is impressed with a signal detected in the manner as described above. As the high-voltage regulation transistor 16, any NPN type or PNP type transistor may be used. Needless to say, the polarity of the drive source or the control signal should be taken into consideration according to the type of transistor used therein.

In FIG. 9, the transistor 16 for driving the control winding 15 is used in the form of an emitter follower circuit. Such arrangement prevents the transistor 16 from being subjected to deterioration due to a spark occurring in the color picture tube or in the high-voltage rectifier tube. Furthermore, in case the resistance 33 is connected in series with the emitter electrode of the transistor 16 of the emitter-follower, supposing that R is the resistance of the resistor 33, $r$ is the input resistance of the network involving the transistor which is observed at the side of the emitter and V is a surge pulse voltage developed across the control winding, the voltage, $R/(R+r)\cdot r)^0V$ is impressed on the transistor 16 and the input resistance $r$ normally appreciably small. Therefore, the insertion of the resistor 33 does not effectively protect the transistor from such surge pulse voltage. Further no control is affected by the insertion of the resistor 33 because the current amplification factor of the transistor 16 is independent of it. Needless to say, such emitter-follower circuit is not limited to the use of the embodiment in FIG. 9 and therefore, it is applicable also to the above-mentioned embodiment in which a transistor amplifier is employed.

Figure 10:
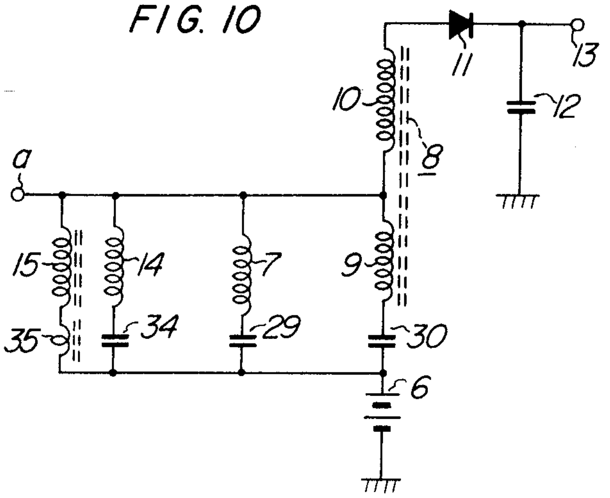

Referring to FIG. 10, there is shown a circuit diagram of a further embodiment of the present invention, in which reference numerals of parts used therein correspond to those in FIG. 1, numerals 29, 30 and 34 represent DC blocking capacitors and 15 a control winding and 35 an inductance element for preventing an AC current from flowing in the control winding 15. The present embodiment is such that the inductance $L_x$ of the high voltage regulation coil 14 is controlled by the variation of a DC current supplied from the DC source 6 which is caused by the variation of the high voltage as in the embodiment of FIG. 8. That is, if the beam current of the CRT is increased, the DC current from the DC power source 6 is increased to flow in the control winding 15. Therefore, by the effect of the saturable core around which the high-voltage regulation coil 14 and the control winding 15 are wound the inductance $L_x$ of the coil 14 is reduced, thus operating to regulate the variation in high voltage.

Figure 11:
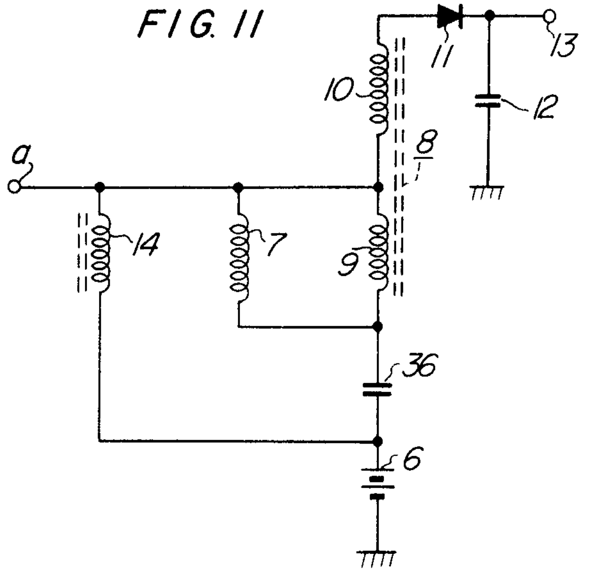

Referring to FIG. 11 there is shown a circuit of still another embodiment of the present invention, in which reference numerals of parts used therein correspond to those in FIG. 1 and numeral 36 represents a DC blocking capacitor. In this embodiment, the capacitor 36 serves as the DC blocking capacitors 29 and 30 shown in the embodiment of FIG. 8, whose operation is the same as that of the embodiment of FIG. 8. It should be noted that the art of this kind is applicable to the embodiment shown in FIG. 10 in the same manner.

As described in detail hereinbefore, since the present invention can regulate the high voltage without using any shunt regulator tube as in the prior art, the high-voltage regulation circuit of the television set can be made of small size without involving any problem of heat sinking. Further the regulation circuit according to the present invention having no shunt regulator tube which is expensive therein is quite economical and permits reduction of emission sources of X-rays which are harmful to the human body. Furthermore, the present invention is advantageous since it makes it possible to achieve an all transistorized color television receiver.

The above-mentioned various embodiments of the present invention have been described merely for illustration, and various modifications and changes are possible. Therefore, the scope of the present invention should not be limited to these embodiments.

We claim:

1. In a horizontal deflection and high-voltage system for television including a DC power source for supplying a DC voltage to the system, a high-voltage terminal for connection to a picture tube, a horizontal deflection yoke energizable to produce line deflection of an electron beam, switching means connected to said horizontal deflection yoke to produce a line trace movements of the electron beam and for cutting off such energizing voltage to produce retrace movements of the electron beam in response to input horizontal deflection sychronizing signals, transformer means connected to said horizontal deflection yoke for producing a high-voltage flyback pulse, and rectifying means connected to said high-voltage terminal the flyback pulse to produce a high-voltage power for electron beam acceleration, a high-voltage regulation circuit comprising:

a variable inductance element connected between said switching means and said DC power source in parallel with said horizontal deflection yoke, so that DC current generated from said DC power source is supplied to said switching means through said variable inductance element, whereby the inductance of said inductance element is controlled so as to decrease or increase the inductance in response to an increase or a decrease in the DC current from said DC power source, respectively.

2. The combination defined in claim 1, wherein said horizontal deflection yoke and said transformer means generating said flyback pulse are coupled respectively with said DC power source through at least one capacitor.

3. In a color television receiver having a. a color picture tube;

b. a DC power source for the receiver;

C. horizontal deflection means for providing a horizontal line deflection of an electron beam in said tube, comprising: switching means supplied with input periodic line synchronizing signals and selectively rendered conductive in response to the line synchronizing signals supplied thereto; yoke coil means for providing, when energized, the horizontal line deflection of the electron beam in said tube; first connecting means for connecting said DC power source through said yoke coil means in series with said switching means, so that a series circuit of said DC power source and said yoke coil means is coupled across said switching means, and resonant means connected in parallel across said switching means for forming together with said yoke coil means a parallel resonant circuit, said resonant means including a capacitor and a damper diode so that a sawtooth current with step retrace portions therein is applied through said yoke coil means due to operation of said switching means; and d. a high voltage circuit for generating a DC high voltage, comprising: a flyback transformer having primary and secondary windings electromagnetically coupled together; second connecting means for coupling said primary winding of said flyback transformer in parallel with said yoke coil means to form a parallel circuit therewith so that a part of said sawtooth current flows through said primary winding to produce a boosted high-voltage flyback across the secondary winding in response to the supply of the retrace portion of the sawtooth current to said primary winding, and a rectifying circuit connected to said secondary winding for rectifying the flyback pulse to produce the DC high voltage;

e. A DC high-voltage regulation circuit comprising: variable inductance means including a variable inductance element for providing increasing and decreasing inductance in response to decrease and increase respectively, of a current flowing therethrough; third connecting means for connecting said DC power source through said variable inductance means in series with said switching means and to said secondary winding of said flyback transformer, respectively, so as to allow DC current from said DC power source to pass through said variable inductance means to said switching means and to said rectifying circuit via said secondary winding, and blocking means including at least one capacitor connecting both said yoke coil means and said primary winding of the flyback transformer in series with said DC power source and said switching means so that said variable inductance means, said yoke coil means and said primary winding are coupled in parallel together with respect to the AC component of the sawtooth current while the DC current is blocked from passing through both said yoke coil means and said primary winding, whereby increase and decrease in the DC high-voltage due to decrease and increase, respectively, of the DC high-voltage current flowing through said color picture tube directly effects increase and decrease, respectively, in the inductance of the variable inductance element of the variable inductance means, to thereby regulate the fluctuation of said DC high voltage, wherein said variable inductance means includes: a magnetically saturable core; a high voltage regulation coil wound around said core, said coil acting as said variable inductance element, and said connecting means includes means for connecting said high-voltage regulation coil in series with said DC power source to form a series circuit therewith and for connecting DC power power source to form a series circuit therewith and for connecting the series circuit of said coil and said DC power source across said switching means so that the DC current from said DC power source to said switching means and said secondary winding flows through said coil, whereby the inductance of the coil is increased and decreased in response to decrease and increase, respectively, of the current flowing therethrough, to thereby regulate the fluctuation of the DC high voltage.

4. In a color television receiver having a color picture tube, a DC power source for the receiver, a horizontal deflection output transistor supplied with periodic horizontal line synchronizing signals and operatively rendered conductive in response to said synchronizing signals supplied thereto, a damper diode and a resonant capacitor coupled respectively in parallel across the output of said transistor, a horizontal yoke coil for providing, when energized, a horizontal line deflection of an electron beam in said picture tube, a flyback transformer having primary and secondary windings coupled together, and a high-voltage rectifying circuit connected to said secondary winding, a DC high-voltage regulation circuit comprising a variable inductance assembly including a variable inductance element, which element has an inductance which varies indirectly in response to variation in the current passing through said assembly; first connecting means for connecting said DC power source in series through said variable inductance assembly to said transistor and to said secondary winding, respectively; second connecting means including at least a DC blocking capacitor for connecting both said yoke coil and said primary winding through said DC blocking capacitor in series to said DC power and to both said transistor and said secondary winding so as to allow DC current from said DC power source to pass only through said variable inductance assembly to both said transistor and said rectifying circuit via said secondary winding and so as to couple said variable inductance assembly in parallel with said yoke coil and said primary winding to thereby form a parallel resonant circuit with said resonant capacitor and said damper diode, so that a sawtooth current flows through said primary winding and a high-voltage flyback pulse generated across the secondary winding is rectified by the rectifying circuit into a DC high voltage, whereby the increase and decrease in the DC high voltage are inversely regulated by increase and decrease, respectively, in the inductance of the variable inductance assembly which is directly controlled by the current flowing therethrough, wherein said variable inductance assembly comprises a magnetically saturable core, and a high-voltage regulation coil wound around said core, which coil is connected at one end to said DC power source and at the other end thereof to said transistor and to said secondary winding.

5. In a horizontal deflection and high-voltage system for television including a DC power source, a horizontal reflection yoke, switching means connected in series with said power source and said deflection yoke to selectively energize said deflection yoke from said power source in response to applied input horizontal deflection synchronizing signals, and high-voltage means connected to said deflection yoke for producing a high voltage for electron beam acceleration, a high-voltage regulation circuit comprising variable inductance means connected in parallel with said deflection yoke for providing increasing and decreasing inductance in response to decrease and increase, respectively, in the current flowing therethrough and blocking means for blocking DC current from passing through said deflection yoke from said power source.

6. The combination defined in claim 5, wherein said high voltage means includes a flyback transformer having a primary winding connected in parallel to said deflection yoke and a secondary winding coupled to said primary winding and connected to rectifier means for producing said high voltage, said blocking means also blocking DC current from passing through said primary winding from said power source.

7. The combination defined in claim 6, wherein said blocking means includes first and second capacitors connected in series between said primary winding and said deflection yoke, respectively, and said power source, said variable inductance means being connected directly to said power source.

8. The combination defined in claim 7, wherein said variable inductance means includes a variable inductance element in series with a third capacitor connected across said high-voltage regulation coil inductively coupled through a magnetically saturable core to said variable inductance element, said high-voltage regulation coil being connected in series between said power source and said switching means.